Aug. 4, 1936.  H. HOLZWARTH  2,049,446
EXPLOSION TURBINE WITH FULL ADMISSION HIGH SPEED ROTOR
Filed Aug. 15, 1933   3 Sheets-Sheet 3
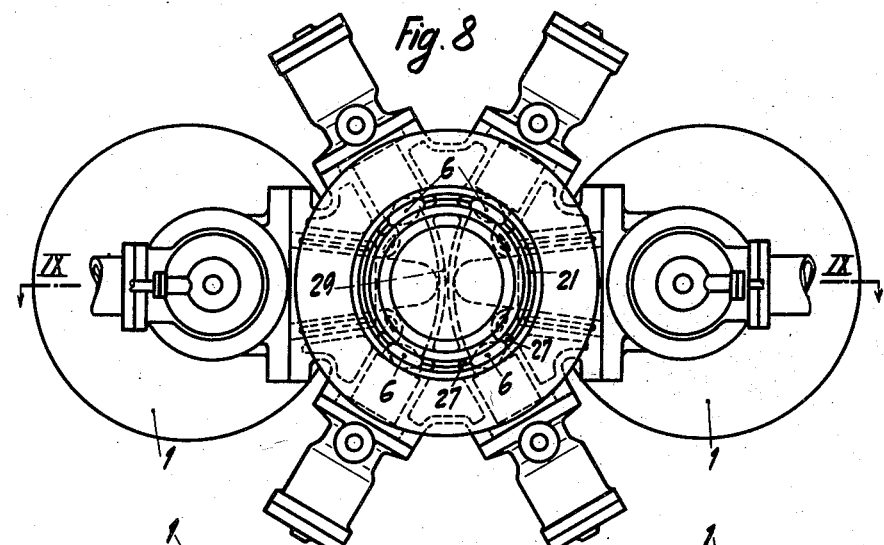
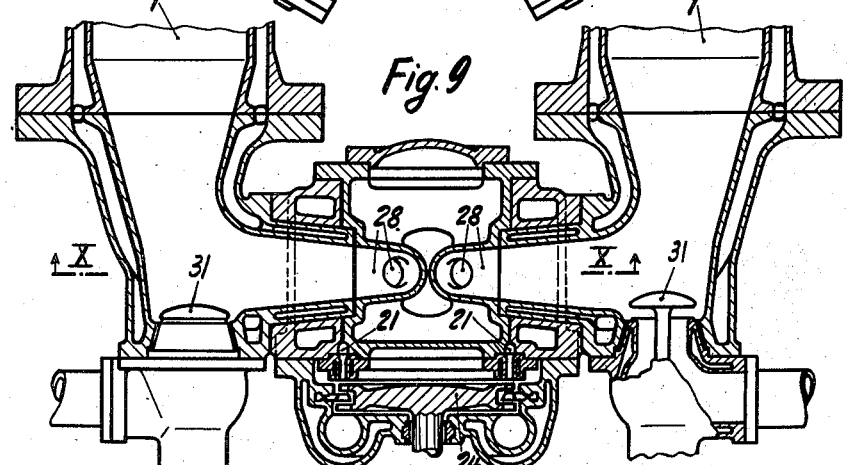
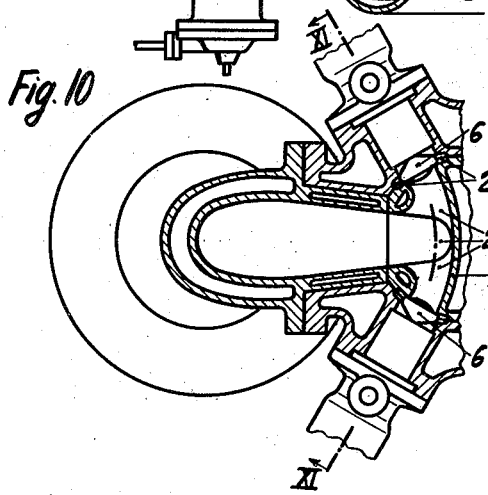
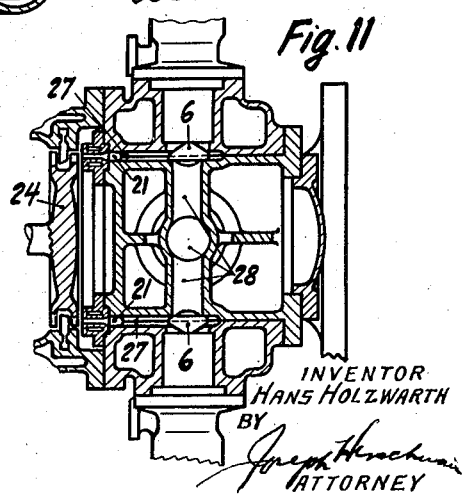
INVENTOR
HANS HOLZWARTH
BY
*Joseph Hirschman*
ATTORNEY Patented Aug. 4, 1936

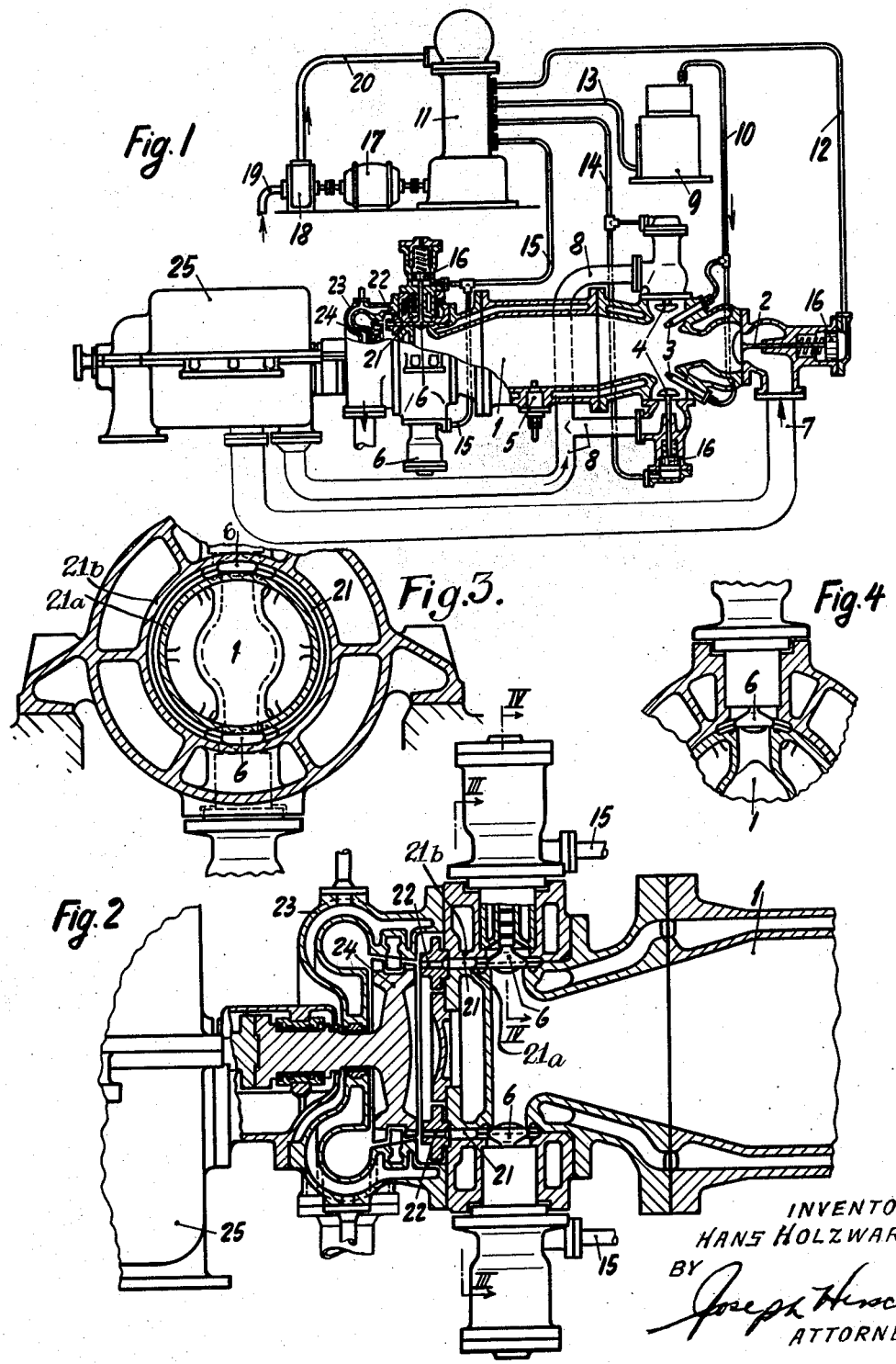

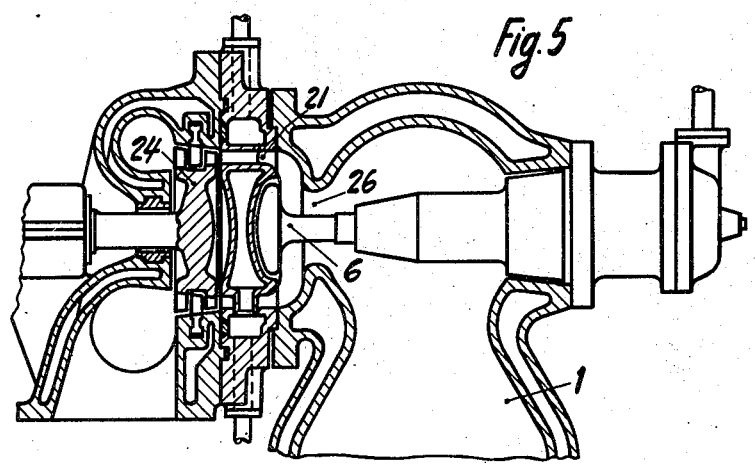
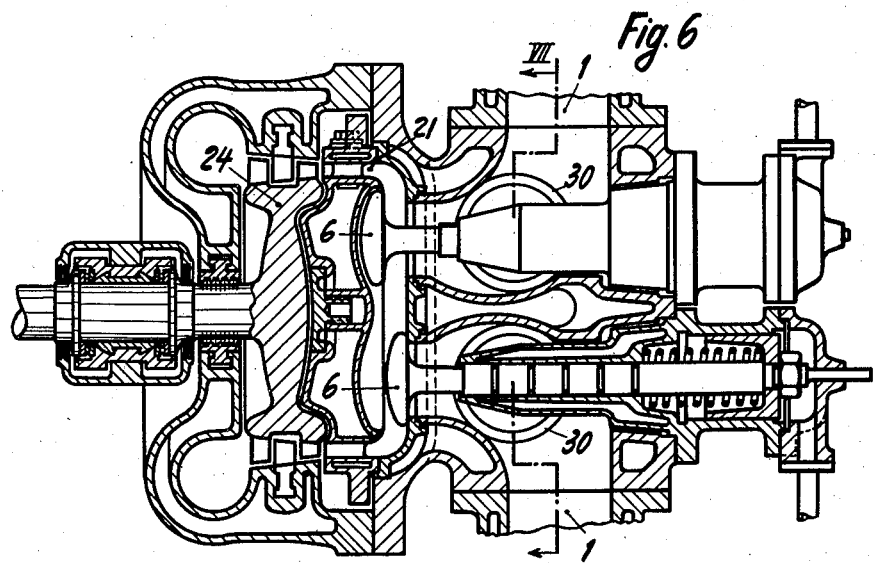
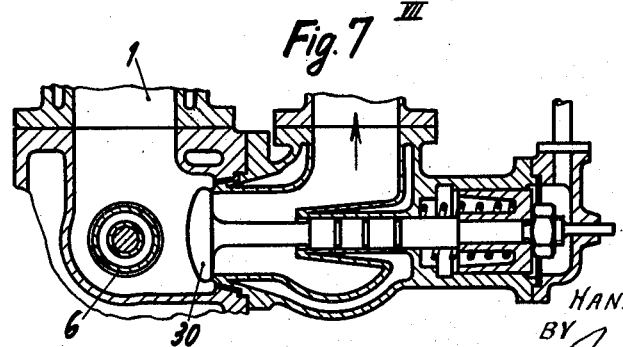

2,049,446

UNITED STATES PATENT OFFICE 2,049,446

EXPLOSION TURBINE WITH FULL ADMISSION HIGH SPEED ROTOR

Hans Holzwarth, Dusseldorf, Germany, assignor to Holzwarth Gas Turbine Co., San Francisco, Calif., a corporation of Delaware Application August 15, 1933, Serial No. 685,207
In Germany August 23, 1932

12 Claims. (Cl. 60—41)

The present invention relates to explosion turbines, wherein the rotor is impinged intermittently by explosion gases generated in one or more constant volume explosion chambers, and has for its object to provide a turbine of this kind which will operate efficiently under full admission.

In the general turbine construction art it is known that technical and economical advantages can be secured with increase in the rotational speed of the rotors of a turbine aggregate.

It might appear to be comparatively obvious to make use of this knowledge of general turbine construction in explosion turbine plants. However, the application of this theory to this special field meets with peculiar difficulties which at first appear to be insurmountable. The main difficulty lies in the fact that by the simple transfer of measures which have become generally known in the field of turbines, to explosion turbines, there would result nozzle channels of such large size as to make the operation of such turbine uneconomical. In the field of explosion turbines, the nozzle channels, that is, the gas conduits between the controlled outlet members of the explosion chambers and the nozzles which are fed with the explosion gases and direct them against the blades, cause very great difficulties. According to the most recent developments and experiences in the explosion turbine field, it is essential, in this special type of turbine, that the nozzle channels be made as small as possible, both as regards their volume and as regards their surface area, in order that the degree of heat transfer in such nozzle channel, which determines the economy of the turbine plant, be small. Even in the case of partial admission explosion turbines, which is the usual construction in this art, wherein the nozzle and consequently the nozzle channel extend over only a portion of the rotor circumference, these nozzle channels have had to be kept as small as practicable in order to obtain a high over-all efficiency. In addition, it is necessary to observe very carefully certain structural requirements in order to equalize the extraordinarily high temperature stresses that occur in operation in the parts forming the nozzle channels and the adjoining structure.

In order to fulfill completely these requirements which are so essential for the economy of the turbine plant it has been the practice heretofore in explosion turbine plants to apportion to each individual explosion chamber only a short impinging arc at the turbine rotor, since in this way it was easiest to keep the associated nozzle channel small. Where the number of explosion chambers was sufficiently large, the result was indeed obtained that the whole circumference of the rotor was struck by the driving gases, but not simultaneously along the whole circumference, the admission along the various arcs of the circumference occurring periodically one after another.

It was recognized that the larger the admission arc for each explosion chamber, or the larger the circumferential length of the nozzle segment, the more unfavorable, that is, the larger become the nozzle channels, which simultaneously has the disadvantageous result of a fall in the turbine efficiency. It therefore appeared to be entirely without prospect of success to create a form of nozzle channel which made it possible to conduct the gases from the explosion chamber into the nozzle assembly in the same manner as in full admission turbine rotors, especially of high speed, while yet keeping the volume and surface of such channel sufficiently small to keep the heat losses in the channel low. For this reason the endeavor in the explosion turbine art has always been to use as small nozzle segments as possible and to avoid providing a large admission arc for each nozzle segment.

As a result of thorough investigations of the above-mentioned conditions in explosion turbines, I have succeeded in accordance with the invention in providing a simple nozzle arrangement for full admission explosion turbines running at high speeds whose rotor systems have a comparatively small diameter and which are ordinarily equipped with only one or two explosion chambers, it being possible with such nozzle arrangement to limit the size of the nozzle channel in respect both of its volume and its surface area to the smallest degree, thereby favoring the economy of operation of such a turbine. The construction proposed by the present invention is characterized essentially by the arrangement of an annular nozzle channel which is struck simultaneously and uniformly, practically upon its whole circumference with varying pressure by the gas charges periodically delivered by the explosion chambers at every discharge, the delivery of the gas to the nozzle channel taking place advantageously from its inner side. Whereas according to prior theory and practice, increase of the admission arc of the turbine rotor by the use of correspondingly large nozzle segments unfavorably affected the conditions of operation in the explosion turbine because of simultaneous enlargement of the nozzle channel, the conditions of operation, contrary to accepted prior theory, are rendered very favorable by the use of my novel nozzle channel which is fed with gases simultaneously throughout its length. By the arrangement of an annular nozzle channel in association with a full admission turbine rotor of high speed, the nozzle channel can be constructed of extremely small volume. The annular nozzle channel may with advantage be arranged in such a manner that its axis lies parallel to the axis of the explosion chambers. If only a single chamber is provided for feeding the nozzle channel, the channel and the chamber may be arranged in axial registry so that their axes coincide. In order to make the filling of the annular nozzle channel in such an arrangement symmetrical, the channel is closed toward the explosion chamber with, preferably, at least two closure members (nozzle valves) which are preferably operated in parallel, that is, in the same sense. If, on the other hand, an explosion chamber is provided with only one nozzle valve, then it is of advantage, particularly with regard to obtaining symmetrical impingement of the annular nozzle channel, to arrange the explosion chamber in such a manner that the axis of the nozzle valve coincides with the axis of the nozzle channel.

Several constructional examples embodying the invention are shown by way of illustration upon accompanying drawings, in which Fig. 1 is a schematic view in elevation partly in section of an explosion plant, the explosion turbine being shown as arranged to operate a compressor for producing the charging and/or scavenging air for the explosion chamber;

Fig. 2 is a vertical longitudinal section through the discharge end of the explosion chamber, together with the associated turbine rotor and housing on an enlarged scale;

Fig. 3 is a vertical section along the line III—III of Fig. 2;

Fig. 4 is a similar partial section through the discharge end of the explosion chamber along the line IV—IV of Fig. 2;

Fig. 5 illustrates another embodiment of the invention and shows the discharge end of an explosion chamber in vertical, longitudinal section, the outlet or nozzle valve being coaxial with the turbine rotor and with the annular nozzle channel;

Fig. 6 shows a section through an arrangement involving two explosion chambers arranged perpendicularly to the turbine axis, each having an outlet valve whose axis is parallel to the axis of the rotor and of the nozzle channel, each chamber being equipped with a separate outlet valve for scavenging purposes;

Fig. 7 is a section through one of the explosion chambers of Fig. 6 along the line VII—VII of such figure, the scavenging valve being shown in section.

Fig. 8 shows a fourth constructional example of a turbine plant embodying the inventive idea and comprising two explosion chambers which are shown in end view, the turbine housing being removed and likewise the nozzle, each explosion chamber being connected with the turbine rotor through two outlet valves.

Fig. 9 is a horizontal section through the discharge end of the explosion chambers and the associated turbine along the line IX—IX of Fig. 8;

Fig. 10 shows a partial section through the discharge end of an explosion chamber along the line X—X of Fig. 9, while Fig. 11 illustrates a longitudinal section along the line XI—XI of Fig. 10.

In Figs. 1 to 4, the numeral 1 indicates an elongated explosion chamber provided with conical end sections. The explosion chamber is provided with a scavenging valve 2, two fuel inlet members 3, two air charging valves 4, an igniting device 5 and two outlet or nozzle valves 6. The scavenging air flows through the conduit 7 while the charging air flows through the conduit 8, to the respective valves, while the fuel is supplied by the pump or equivalent device 9 of known construction through the conduit 10 to the two inlet members 3. A suitable form of pump is shown in my copending application Serial No. 570,106. The fuel pump 9, the air inlet members 2 and 4, and the nozzle valves 6 are controlled in known manner by a fluid under pressure, preferably pressure oil, in accordance with the working cycle of the explosion process. The pressure oil is brought into action upon the control members, to actuate them periodically, each member being spring-pressed and being provided with a control piston 16. The pressure oil is controlled by any suitable apparatus which may be in the form of a distributor 11, and flows through separate conduits 12, 13, 14 and 15 at predetermined instants to the control pistons 16 of the controlled members. The distributor 11 may be of any suitable construction, such as shown in greater detail in my United States Patent No. 1,810,768. The distributor 11 is driven by the motor 17 which simultaneously drives the pump 18 which sucks the controlling fluid (pressure oil) through conduits 19 from a source of supply and forces it under pressure through conduit 20 into the interior of the distributor. The explosion gases generated by the ignition of a combustible fuel and air mixture in the chamber 1 flow, upon opening of the nozzle valve 6, through the nozzle channel 21 and the nozzles 22 to the explosion turbine 23 where they impinge the rotor 24. The latter may be arranged to drive any suitable machine, such as the compressor 25 which supplies the explosion chamber with compressed air. The turbine rotor 24 is coaxial with the chamber 1, the turbine housing abutting against the end face of the conical outlet section of the chamber. The turbine rotor is constructed as a full admission rotor, running at a comparatively high speed, for example, 8500 revolutions per minute.

According to the invention, the nozzle channel 21 between the nozzles 22 and the nozzle valve 6 is built of annular form. In this way the impingement of the rotor occurs practically over its entire circumference simultaneously and uniformly with varying pressure at every periodic discharge from the explosion chamber 1, while at the same time a comparatively small nozzle channel is required due to the annular form. The drawing shows clearly how extremely small the size of the whole channel is, due to the fact that the gas feed to such channel occurs from the direction of the axis of the annulus and not from the exterior of the annular cross section of the channel. Exact measurements have shown that the annular nozzle channel is smaller than the nozzle channel of prior arrangements wherein the rotor was impinged only along a portion of its circumference. In consequence of the fact that the two symmetrically arranged nozzle valves 6 of the explosion chamber are controlled in the same way, that is, they discharge the explosion gases simultaneously, a completely symmetrical filling of the annular nozzle channel is secured.

Fig. 5 shows an arrangement which differs from that above-described merely in the fact that only a single nozzle valve 6 is provided laterally of the outlet section of the chamber whose axis is perpendicular to the axis of the turbine rotor. The valve is so arranged that its axis, or the axis of the outlet passage 26, coincides with the axis of the rotor. In this way the result is obtained that the annular space 21 is charged uniformly at all parts of its inlet with gases intermittently discharged from the explosion chamber 1. Especially with this arrangement of the nozzle valve, there is obtained practically the smallest possible volume and surface area of the nozzle channel because, as can be seen from Fig. 5, only a very small connecting passage is required between the annular space 21 and the discharge passage 26 of the valve. The conditions are therefore provided which are controlling for the maximum economy of operation.

In Figs. 6 and 7 there is shown another embodiment of the invention in which, contrary to the constructions above-described, wherein only a single explosion chamber is associated with the nozzle channel, the nozzle channel 21 is fed by two explosion chambers 1 of which, for the sake of simplicity, only the outlet ends are shown, as their general construction is essentially the same as that of the chamber shown in Fig. 1. The nozzle valve of each chamber is again indicated at 6. The axis of both valves runs parallel to the axis of the turbine rotor 24; they lie inside of the circular arc of the annular nozzle channel 21 in such a manner that the outer edge of the outlet cross section of each nozzle valve is as close as possible to the inner annular edge of the nozzle channel. As can be seen from Fig. 6, both explosion chambers discharge alternatingly into the common nozzle channel 21. In view of this mode of operation each chamber has a separate auxiliary outlet valve 30 for the residual gases, the axis of such valve being perpendicular to the axis of the associated nozzle valve 6. This separate outlet valve is necessary for discharging the residual gases remaining after every discharge of working explosion gases, such residual gases being expelled by the incoming charge of air. This scavenging otherwise occurs ordinarily through the nozzle valve 6 through which the high pressure gases escape. This latter method cannot, however, be carried out with the arrangement of Fig. 6 wherein the two chambers discharge into the common nozzle channel because during the scavenging of one chamber, the other chamber discharges pressure gases into the nozzle channel, so that a high pressure exists in the latter which pressure, if the chamber being scavenged were in communication with the nozzle channel, would prevent scavenging of the latter chamber. It will be understood that after the discharge of the high pressure gases into the nozzle channel, the valve 6 is closed and the valve 30 opened as scavenging air is admitted into the explosion chamber.

The actuation of the two valves 30, like that of the valves 6, is accomplished hydraulically. Where the operation of the plant is so conducted that the two explosion chambers do not discharge alternately but rather simultaneously into the annular nozzle channel 21, then in such case the auxiliary outlet valves 30 may be dispensed with and the residual gases can be discharged in known manner through the nozzle valves 6.

Figs. 8 to 11 show a further embodiment of the invention, likewise with two explosion chambers 1 whose longitudinal axis lies parallel to the axis of the rotor 24. Each individual chamber feeds the common annular nozzle channel 21 through two nozzle valves 6 (see Figs. 10 and 11) to which is connected a shallow transition space 27 running to the common annular channel 21. The outlet end of each chamber is formed as a three-branched structure 28, one branch running substantially at right angles to the chamber axes, as shown in Fig. 9, and leading into the other two branches 28, as best shown in Fig. 10, the latter two branches being controlled by the valves 6. The structures 28 of the two chambers are completely separated from each other by an insert 29. Similarly to the construction of Figs. 6 and 7 above-described, the two explosion chambers 1 may be caused to discharge alternatingly into the common channel 21. In such case each chamber is provided with an auxiliary outlet valve 31 for the residual gases which is constructed and operated in a manner similar to the valves 30 of Figs. 6 and 7. Where the two explosion chambers are designed to discharge simultaneously into the channel 21, the auxiliary valves can again be dispensed with and the residual gases caused to discharge through the nozzle valves 6.

It will be noted that in each of the constructions described above, the annular nozzle-channel 21 is defined by a central, substantially cylindrical body 21a and an annular member 21b surrounding the cylindrical body and slightly spaced therefrom. In the form of the invention shown in Figs. 1-4, the cylindrical body 21a is integral with the end section of the explosion chamber, while the annular member 21b forms part of the ring upon and within which the nozzle valves 6 are mounted.

It is within the scope of the invention to change the individual parts of the plant both as regards form and arrangement in a great variety of ways without departing from the general object of reducing the size of the nozzle channel in a full admission explosion turbine by the use of an annular construction for such channel.

I claim:

1. An explosion turbine arrangement for operating a full admission rotor with live explosion gases without excessive loss of heat in the channel in advance of the rotor or excessive drop in pressure in advance of the gas nozzles from the maximum explosion pressure, comprising a full admission explosion turbine rotor adapted to be operated at high speeds with intermittent puffs of gases, a pistonless, constant volume explosion chamber having controlled devices for charging fuel and air periodically thereinto for explosion therein, a nozzle assembly for directing explosion gases against the rotor along substantially its whole circumference, periodically operated outlet mechanism for said explosion chamber adapted to control the passage of explosion gases from the chamber to said nozzles, said nozzles thus receiving live explosion gases of high pressure directly from the chamber, a substantially annular nozzle channel between such outlet mechanism and said nozzle assembly and arranged to be fed substantially uniformly with gases throughout practically its entire inlet at every periodic discharge of gases from the explosion chamber and to direct such gases into the whole of said nozzle assembly, whereby gases are charged simultaneously against substantially the whole ring of rotor blades, said channel being formed throughout by annular walls whose interior, gas-contacted surfaces run substantially parallel to each other up to the inlet of the nozzle assembly, said channel being thus free of enlargements forming collecting spaces and having a minimum of internal volume and surface area, and timing mechanism for controlling the said charging devices and outlet mechanism.

2. A turbine as set forth in claim 1, wherein the connection between the outlet of the chamber and the inlet of the channel opens into the latter from the inner side of the same.

3. An explosion turbine according to claim 1, wherein the nozzle channel is formed of a cylindrical body and an annular body surrounding and spaced from such cylindrical body.

4. An explosion turbine according to claim 1, wherein the nozzle channel is formed of a cylindrical body and an annular body surrounding and spaced from such cylindrical body, the cylindrical body being formed of the end section of the explosion chamber while the annular body is formed of the outlet valve ring.

5. A turbine arrangement as set forth in claim 1, wherein the diameter of the rotor is of the order of the explosion chamber diameter.

6. An explosion turbine arrangement for operating a full admission rotor with live explosion gases without excessive loss of heat in the channel in advance of the rotor or excessive drop in pressure in advance of the gas nozzles from the maximum explosion pressure, comprising a substantially full admission explosion turbine rotor adapted to be operated at high speeds with intermittent puffs of explosion gases, a pistonless constant volume explosion chamber having controlled devices for charging fuel and air periodically thereinto for explosion therein, a substantially annular nozzle channel in advance of the rotor for directing explosion gases to the latter, periodically operated outlet mechanism for said explosion chamber adapted to control the passage of explosion gases from the chamber to said channel, the latter thus receiving live explosion gases of high pressure directly from the chamber, said channel being defined by two cylindrical walls whose extension confines a space within which the gas passages are confined, and timing mechanism for controlling the said charging devices and outlet mechanism.

7. An explosion turbine arrangement according to claim 6, wherein the diameter of the annular nozzle channel corresponds approximately to that of the explosion chamber.

8. An explosion turbine arrangement according to claim 6, wherein the nozzle arc associated with the annular nozzle channel is of closed annular form in order to direct gases substantially simultaneously against the whole circumference of the explosion turbine rotor.

9. An explosion turbine arrangement according to claim 6, wherein the annular channel is constructed of a substantially cylindrical member concentric with the axis of the rotor and of an annular member spaced from such cylindrical member.

10. An explosion turbine arrangement according to claim 6, wherein the outlet mechanism comprises one or more nozzle valves and wherein the outlet valve axis lies parallel to the rotor axis, while the explosion chamber axis is approximately at right angles to such rotor axis.

11. An explosion turbine arrangement according to claim 6, wherein the outlet mechanism comprises one or more nozzle valves and wherein the explosion chamber axis lies parallel to the rotor axis, while the outlet valve axis is approximately at right angles to such rotor axis.

12. An explosion turbine arrangement according to claim 1, wherein the outlet of the explosion chamber is located within the confines of an extension of the annular nozzle channel.

HANS HOLZWARTH.